March 6, 1951         D. FIRTH         2,543,905
SHAFT BEARING
Filed Aug. 30, 1945         3 Sheets-Sheet 1
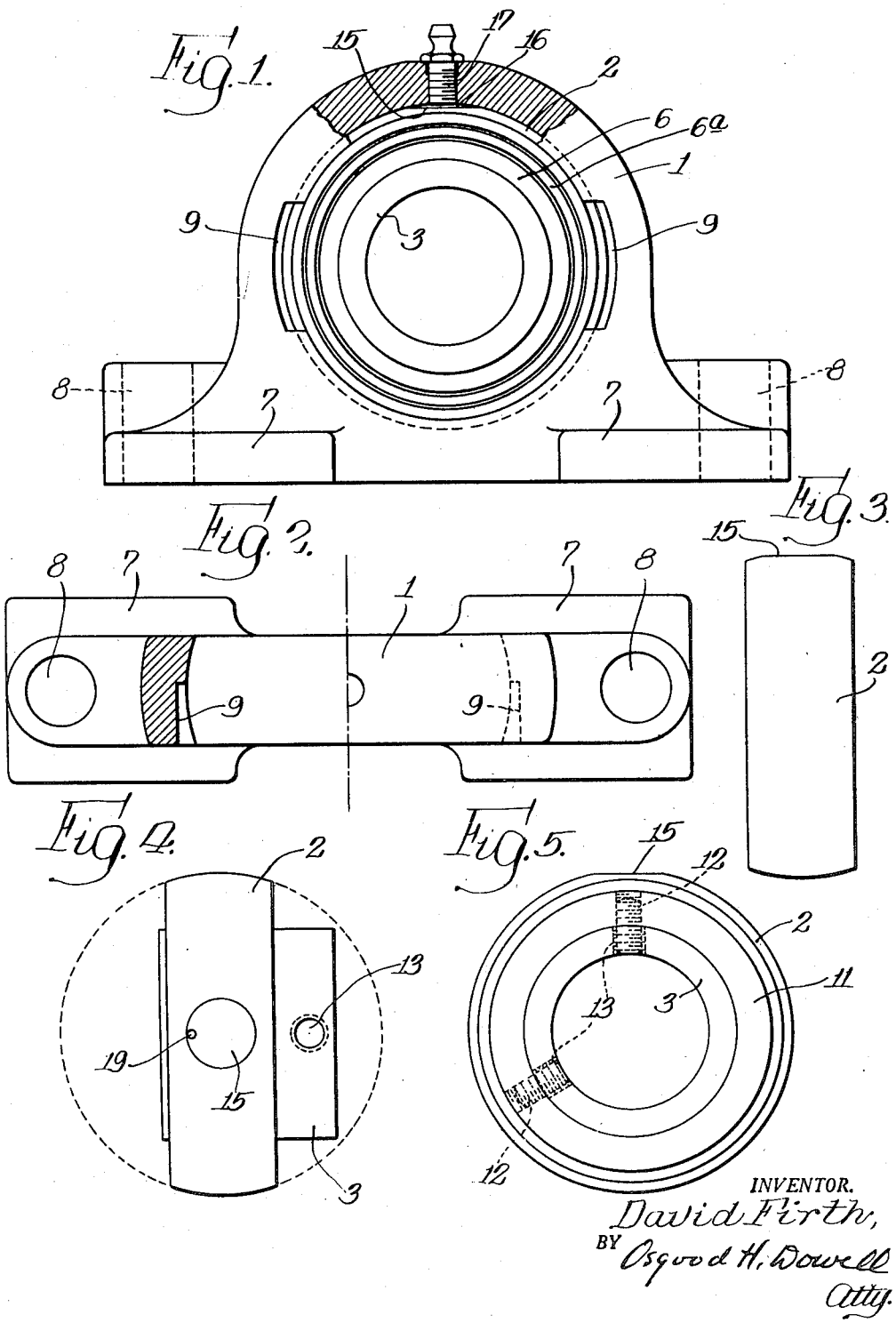
INVENTOR.
David Firth,
BY Osgood H. Dowell
Atty.

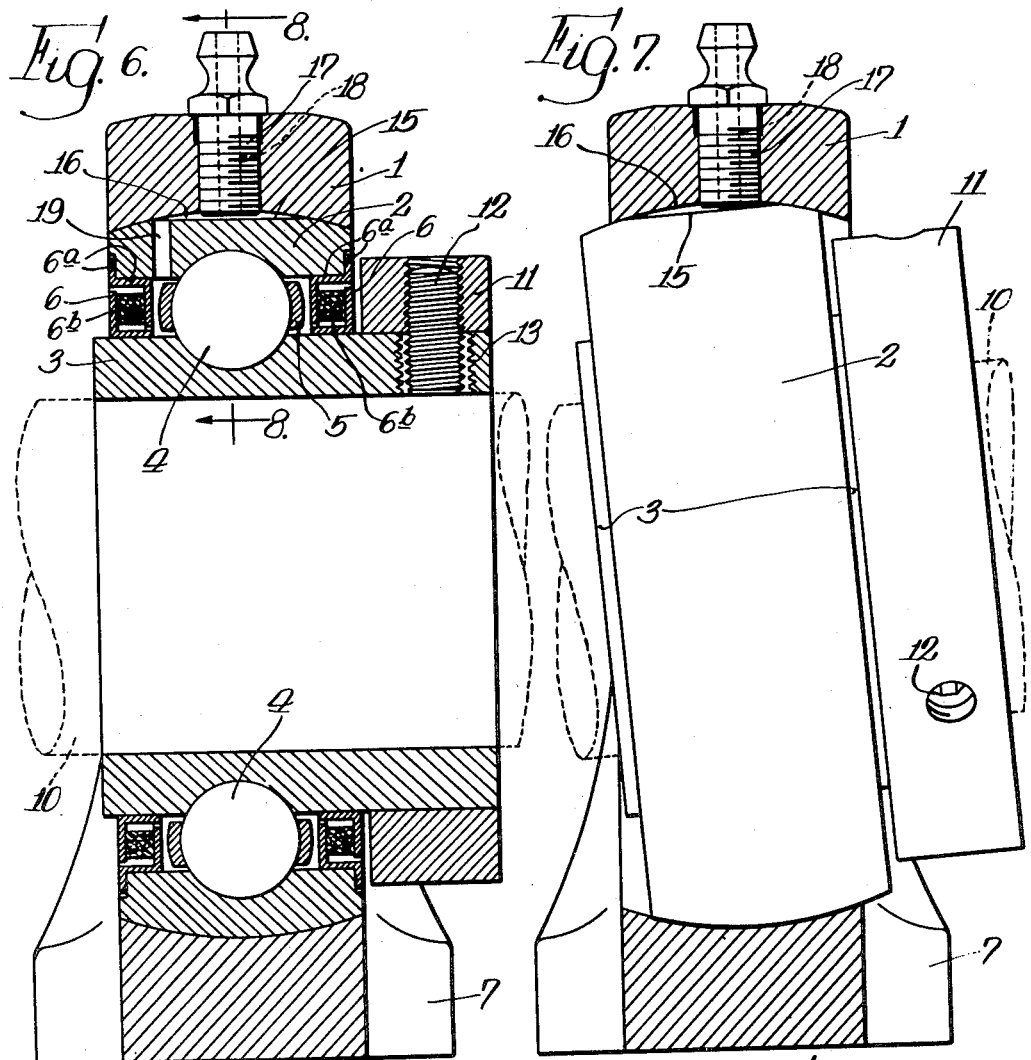
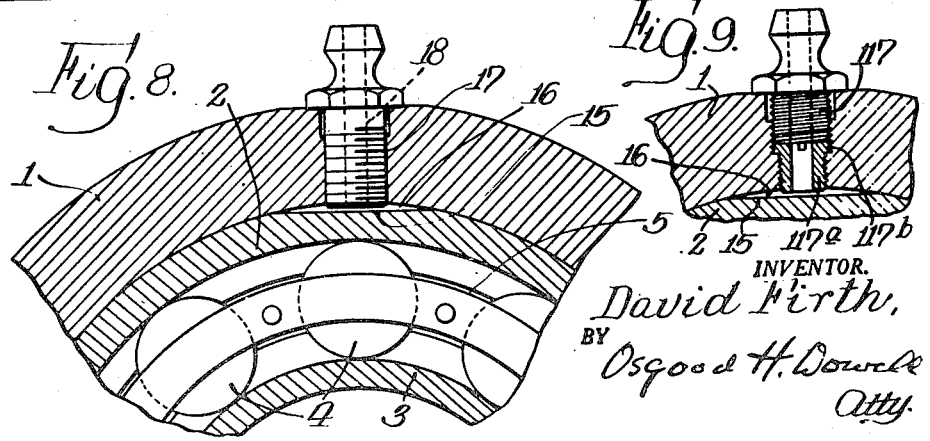

March 6, 1951 D. FIRTH 2,543,905
SHAFT BEARING
Filed Aug. 30, 1945 3 Sheets-Sheet 3
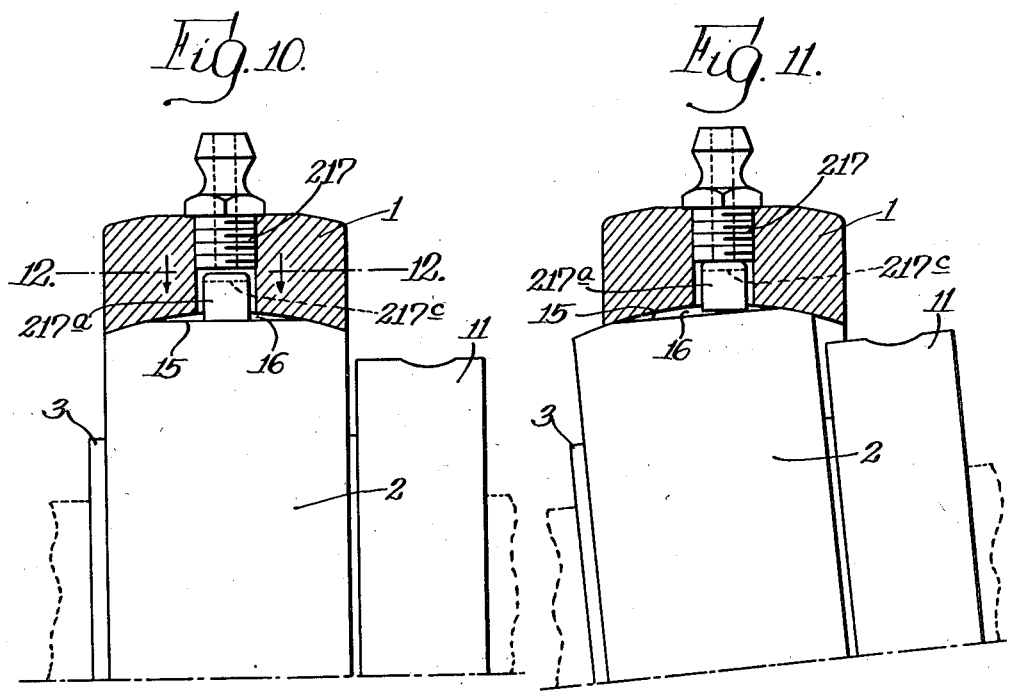
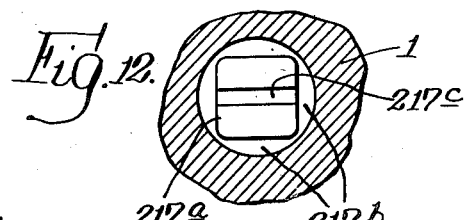
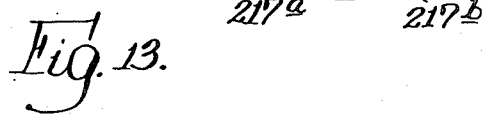
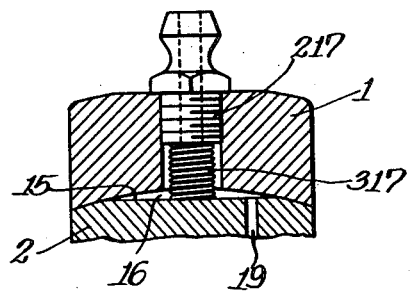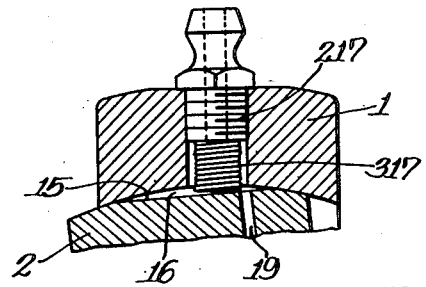
INVENTOR.
David Firth.
BY Osgood H. Dowell
Atty.

Patented Mar. 6, 1951

2,543,905

UNITED STATES PATENT OFFICE 2,543,905

SHAFT BEARING

David Firth, South Bend, Ind., assignor to Dodge Manufacturing Corporation, Mishawaka, Ind., a corporation of Indiana Application August 30, 1945, Serial No. 613,471

6 Claims. (Cl. 308—187)

This invention relates to a self-aligning antifraction shaft bearing, more particularly of the type comprising a sealed annular antifriction bearing unit having an exteriorly spherical outer race ring fitting an interiorly spherical housing encircling such ring. The invention aims to provide in a bearing of said type improved means for limiting universal movement of the bearing unit in the housing and for admission of lubricant through the housing and outer race ring to the interior of the sealed unit. Another object is to provide in a bearing of said type improved means for fastening the inner race ring to the shaft to which it is applied.

A shaft bearing of one practicable construction embodying the invention is shown for illustration in the accompanying drawings, by reference to which the invention will be readily understood.

In said drawings:

Fig. 1 is a front elevation of the illustrative shaft bearing, with an upper part of the housing broken away.

Fig. 2 is a plan view, half in elevation and half in central horizontal section, of the bearing housing.

Fig. 3 is a side elevation of the outer race ring of the annular antifriction bearing unit.

Fig. 4 is a plan view of said bearing unit, indicating by a dotted circle the geometric sphere which is coincident with the spherical outer surface of the outer race ring.

Fig. 5 is a rear end elevation of said annular bearing unit and a collar 11 fitted on the extended end of its inner race ring.

Fig. 6 is an enlarged longitudinal vertical section of the illustrative shaft bearing.

Fig. 7 is a corresponding view showing the housing in longitudinal vertical section and the annular bearing unit in side elevation and in a tilted relation to the housing.

Fig. 8 is a partial cross section taken on the line 8—8 of Fig. 6.

Fig. 9 is a detail view showing an alternative lubricant fitting.

Figs. 10 to 12 illustrate in a bearing structure generally similar to that first shown a different lubricant fitting and retaining means; Figs. 10 and 11 being half sections corresponding respectively to Figs. 6 and 7, and Fig. 12 a section taken on the line 12—12 of Fig. 10.

Figs. 13 and 14 are sectional views corresponding to Figs. 10 and 11 of another structure within the scope of the invention.

Referring to Figs. 1 to 8, the shaft bearing therein shown comprises a one-piece housing 1 containing an annular ball bearing unit whose outer race ring 2 has a spherical periphery fitting the interior spherical surface of the housing. It will be understood that the outer race ring 2 is held against displacement relative to the inner race ring 3 by the interposed annular series of balls 4. A ball spacing device is indicated at 5. Sealing closures are provided by the flanged sheet-metal rings 6 and 6ª and interposed packings 6ᵇ of felt or the like, the sealing rings 6ª being pressed in the outer race ring 2 and the sealing rings 6 being pressed on the inner race ring 3.

The housing 1 may be considered as annular in the sense that it encircles the contained unit as a ring, though it is shown as a pillow block having an extended base portion formed with foot extensions 7 and provided with holes 8 for bolts or screws for attaching it to a support. If desired, the housing could be truly annular in the sense of having a circular exterior concentric with the bore or hole through the housing, in which case it could be mounted in a separable strap-type supporting and holding structure such for example as is disclosed in the Carver Patent 1,951,055 of October 17, 1933.

The one-piece housing shown is of a conventional form having diametrically opposed interior longitudinal slots 9 intersecting the geometric spherical zone represented by the interior spherical surface of the housing. These slots, formed and arranged as shown, permit the ball bearing unit while held with its axis vertical to be inserted through said slots to a position in the housing in which the outer race ring of said unit is clear of said slots and wholly within the geometric sphere coincident with the interior spherical surface of the housing. The unit so inserted may then be tilted through an angle of 90 degrees into seated and erect position in the housing, with its axis coincident with the housing axis.

As appears from Fig. 4, the sealed ball bearing unit, whose inner race ring 3 is shown as elongated and extending beyond an end of the outer race ring 2, is wholly within the geometric sphere coincident with the spherical periphery of the outer race ring. Hence before attaching the collar 11 said unit can be rotated in the housing through an angle of 360 degrees on an infinity of axes, or universally about the center of sphericity. The bearing unit may be mounted in the housing with the extension of the inner race ring projecting either forwardly or backwardly.

Should it be desired to reverse its position in the housing, this may be accomplished simply by turning it on a transverse axis through an angle of 180 degrees.

In the construction shown, the inner race ring 3 is bored to fit the shaft to which the bearing is to be applied, such shaft being indicated by dotted lines and designated by the numeral 10 in Figs. 6 and 7. Fitted on the extension of said inner race ring is a removable collar 11 of unhardened metal carrying a pair of radially disposed set screws 12 threaded in the collar and extending through but free from threaded engagement with said race ring; these set screws being appropriately spaced an angular distance apart of substantially less than 180 degrees, preferable with their centers 120 degrees apart. By tightening said set screws against the shaft, the inner race ring can be fastened rigidly to the shaft by clamping the extension of said race ring between the shaft and collar. As appears from Fig. 7, there is ample clearance between the collar 11 and adjacent end of the housing to permit universal angling of the bearing unit in the housing as required to adapt the bearing to the shaft alignment.

The fastening of the inner race ring to the shaft by a collar and set screws has a number of advantages over that of a direct set screw connection between said race ring and shaft. However, the holes 13 in which the set screws 12 pass loosely through the extended end of the inner race ring are shown as threaded holes sufficiently large to permit the set screws to pass through them free from engagement with their threads, but in which larger set screws could be used for fastening said race ring to the shaft. If therefore for any reason the collar should not be desired, it could be removed and larger set screws could then be used in the screw holes 13 for a direct set screwing of the inner race ring to the shaft.

The outer race ring 2 has its spherical periphery slightly truncated to form a circular flat surface 15 bounded by the spherical surface thereof, the circle at which these surfaces meet being that which is defined by the intersection of the plane of said flat surface with the zone of the sphere represented by said periphery. Said flat surface is centered at or about at the medial transverse plane of the ball bearing unit, which is the plane of ball centers and of greatest diameter of the outer race ring. Conditions are maintained as hereinafter described whereby said flat surface is always surrounded by contacting spherical surfaces of the outer race ring and housing, thereby providing a closed lubricant space or chamber 16 between said flat surface and the confronting interior spherical surface of the housing. Lubricant can be introduced into said space 16 through an appropriate fitting 17 fixed in the housing, the bore or passage through said fitting being indicated in dotted lines at 18 in Figs. 6 to 8. The lubricant space 16 communicates with the interior of the sealed bearing unit through a duct or hole 19 drilled through the race ring 2 from said flat surface 15, said duct being located to one side of the ball race between it and the adjacent sealing closure.

In the construction shown in Figs. 1 and 6 to 8, the lubricant fitting 17 is shown as a radially disposed tubular screw of conventional type, screwed into a tapped hole in the upper part of the housing. For convenience of illustration, it is shown arranged at the top of the housing, though in practice it may be arranged laterally of the housing at any suitable location, provided that the flat surface 15 and lubricant space 16 must be entirely above the internal longitudinal slots 9. The lubricant screw is arranged about midway of the ends of the housing, so that when the ball bearing unit is fitted in and aligned with the housing the center of the flat surface 15 may be brought opposite said screw, as shown in Figs. 1, 6 and 8.

The inner end of the lubricant screw 17 protrudes slightly into the space 16 and provides a stop for engagement by the flat surface 15 in the manner illustrated in Fig. 7, whereby to limit the universal movability of the ball bearing unit as well as rotative movement of the outer race ring on its own axis. Preferably said screw has a squared off or blunt inner end in a plane normal to the screw axis and with which said flat surface 15 is approximately parallel when the ball bearing unit is in the position relative to the screw shown in Figs. 6 and 8. The clearance between the inner end of the lubricant screw and said flat surface 15 is sufficient to allow ample universal movability of the unit to enable the bearing to adjust itself to suit the shaft alinement, while preventing the unit from assuming such a relation to the housing as to expose said flat surface 15 or any part of its margin. Thus in any position which the ball bearing unit can assume within the motion limits allowed, said flat surface 15 and inlet to the duct 16 are enclosed by the housing and encircled by contacting spherical surfaces of the outer race ring and housing.

By the cooperable means comprising said flat surface 15 and protruding inner end of the lubricating screw, limitation is imposed upon angular movement of the ball bearing unit either on its own axis or about any axis other than one normal to said flat surface or other axis about which the unit could be rotated with the effect of merely rotating or wobbling said flat surface without bringing it into contact with the screw. Hence so long as the screw is in place, the ball bearing unit cannot be turned to a position to permit removing it from the housing; nor can the outer race ring, when the bearing is in use for supporting a rotating shaft, turn in the direction of shaft rotation except to a very limited extent. Thus the means described retains the ball bearing unit against removal and prevents objectionable creeping of the outer race ring when the bearing is in use. On the other hand said means in itself would not prevent turning the ball bearing unit round about in the housing by rotating it on a transverse axis through the center of the flat surface 15 (e. g. the vertical central axis in Fig. 6).

In assembling the bearing structure, the ball bearing unit is inserted in the housing and positioned therein substantially or approximately in alignment therewith before inserting the lubricant screw in the housing or while said screw is retracted sufficiently to be entirely clear of the outer race ring. The ball bearing unit is then rotated on its axis until the flat surface 15 is appropriately positioned under or opposite the screw, which is then screwed into place. Inward movement of the lubricant screw is limited by engagement of its enlarged head with the exterior surface of the housing. Because of the large area of said flat surface relative to the cross-sectional area of the screw, it is comparatively easy in assembling to find the flat surface and to detect when it is appropriately positioned to permit screwing in the screw. Thus conditions are favorable for quick assembling. Furthermore, if the ball bearing unit should have been placed wrong end first in the housing, this may be corrected before applying the collar 11 by simply turning the unit round about in the housing on a transverse axis through the center of the flat surface 15. Whether the unit be arranged with the extended end of the inner race ring projecting from the rear end or the front end of the housing, the flat surface 15 and lubricant screw 17 arranged as shown may always be brought to centered relation while the unit is substantially aligned with or erect in the housing. In short, the position of the ball bearing unit may be reversed in the housing without throwing the device out of kelter.

As will be readily apparent, the described construction is highly practicable for application to bearings of small and medium sizes employing sealed ball bearing units of conventional type, with outer race rings of normal dimensions for such sealed units in encircling housings of the same lengths as said outer race rings; and among other advantages thereof is the amplitude of universal motion of the ball bearing unit which it allows in a bearing of such character. Only a slight truncation of the periphery of the outer race ring is required to provide a flat surface such as 15 of large area relative to the inner end of the lubricant screw, which may be an untapered blunt-ended screw and needs to protrude only sightly inwardly beyond the spherical interior surface of the housing; thus providing a closed lubricant space such as 16 of considerable capacity and in which there is ample room around and beneath the inner end of the lubricant screw to allow a relatively large degree of angular movement of the bearing unit in all directions.

The hole 19 in the outer race ring, though preferably located with its outer end in the flat surface 15, might under some conditions be otherwise arranged, e. g. at a position angularly spaced from that shown in Fig. 2, with its outer end in the spherical surface of said ring and in communication with the lubricant space 16 through a short slot or notch cutting into said flat surface, provided the hole be well within the housing in all positions assumable by the ball bearing unit for self-alignment with the shaft.

A motion-limiting stop such as is afforded by the protruding inner end of the lubricant screw 17 may be provided either by any appropriate fitting for introduction of lubricant from a source outside the housing or by a suitable element removably fixed in the housing. A shorter lubricant screw than 17 may therefore be utilized if desired. For example, as shown in Fig. 9, lubricant may be introduced into the space 16 through a short-shanked screw 117 and an inner screw 117a, the latter being screwed into a tapped bore of smaller diameter than that for the outer screw and having a flange 117b limiting its inward movement. The inner end of the screw 117a protruding into the space 16 provides a stop engageable by the flat surface 15 for limiting motion of the ball bearing unit in the housing in the manner already explained with reference to Figs. 6 and 7.

Figs. 10 to 12 illustrate a bearing similar to that first described except that it utilizes, with a short-shanked lubricant screw 217, an element movable radially in the hole for such screw to provide a stop coactive with the flat surface 15 for motion limitation. The parts in Figs. 10 to 12 identical to those of the device first described are designated by the same reference symbols. In the device of Figs. 10 to 12, lubricant is introduced to the space 16 through the screw 217 and around a pin 217a slidably fitted in the tapped hole for said screw and resting on the flat surface 15. When the ball bearing unit is in the position shown in Fig. 10, which is the same as the position shown in Figs. 6 and 8, a clearance exists between the upper end of the pin 217a and inner end of the screw. As the unit is tilted, as shown in Fig. 11, the flat surface 15 operates cammingly against and lifts the pin, which upon contacting with the screw prevents further movement of the unit in the direction in which it tilts. Thus in Figs. 10 and 11 the lubricant screw coacts with said flat surface indirectly through the interposed pin 217a. Motion limitation is therefore controlled in this instance by the clearance between the pin and screw, which is ample to allow self-alignment of the bearing with the shaft to which it is applied but insufficient to permit movement of the ball bearing unit to a position to expose the flat surface 15 or any part of its margin. As will be apparent, the device of Figs. 10 to 12 has substantially the same capabilities and advantages as that first described. Whether the ball bearing unit be arranged with the extended end of its inner race ring projecting forwardly or backwardly, the flat surface 15 can be properly centered under the screw while the unit is aligned with or erect in the housing; and before application of or upon removal of the collar 11 the position of the ball bearing unit can be reversed in the housing, by rotating it through an angle of 180 degrees, without impairing the centered relation of said flat surface to the screw. On the other hand, the ball bearing unit cannot be rotated on its own axis except to a limited extent nor on any axis sufficiently to open the lubricant space 16 or to expose any part of the lubricant passage to the interior of the sealed ball bearing unit. The pin 217a is shown as a square pin, providing lubricant passages as at 217a between it and the tapped wall of the screw hole. It is shown formed in its top with a slot 217a for passage of lubricant, so as to prevent closing the passage through the screw when the pin is raised thereagainst as in Fig. 11. Of course a round pin or other pin slidably fitted in the screw hole and having a central bore for passage of lubricant may be substituted for the specific pin 217a.

Figs. 13 and 14 partially show a structure similar to the others except that it utilizes a resilient means compressible between the flat surface 16 and lubricant fitting to provide a motion-limiting stop. More specifically the bearing structure of Figs. 13 and 14 is identical to that of Figs. 10 to 12 except for replacement of the pin 217a by an expansible coiled spring 317 arranged between and acting oppositely against said flat surface 15 and the lubricant screw 217. In this instance lubricant may pass to the space 16 through the inside of the spring or between the coils thereof. When the ball bearing unit is in the position shown in Fig. 13, which is the same as the position shown in Fig. 10, a slight clearance exists between the coils of the spring. As the unit tilts out of alignment with the housing, or as it turns on its own axis, the flat surface 15 rides under and raises the lower end of the spring and thus contracts it. When the coils of the spring are forced together, as in Fig. 14, the spring acts much like a solid pin to prevent further tilting of the bearing unit or turning thereof on its own axis. Thus in Figs. 13 and 14 the lubricant screw coacts with the flat surface through the interposed spring for motion limitation. The clearance between the spring coils when the parts are in the position shown in Fig. 13 is sufficient to allow ample universal movement of the bearing unit to adapt itself to the shaft alignment, but is insufficient to allow movement of the unit to a position to expose said flat surface 15 or any part of the margin. The structure of Figs. 13 and 14 has substantially the same capabilities as that of Figs. 10 to 12 and further advantages in that it permits less close machining tolerances, due to the flexibility of the spring, and because the spring pressure tends to hold the outer race ring firmly seated in the housing and to prevent it from hammering against the housing in case of a loose fit between it and the housing.

Reference is made to a copending application of the present inventor filed as a continuation in part hereof, namely, application Serial No. 692,599, filed August 23, 1946, now Patent Number 2,455,166, issued November 30, 1948, claiming the species of the invention herein described with reference to Figs. 13 and 14 hereof, and also describing and claiming certain other specific devices not herein disclosed but embodying the generic invention herein claimed.

I claim:

1. A self-aligning shaft bearing comprising a sealed antifriction bearing unit having an annular series of balls and an outer race ring in which they run, said ring having a spherical periphery with a truncated portion forming a flat surface of circular area centered at approximately the plane of centers of the balls and of a diameter substantially greater than the width of the ball race in said ring, the center of sphericity of said periphery being at approximately said plane, an interiorly spherical housing in which said unit fits and is universally angularly movable for self-alignment with the shaft, said ring and housing cooperating to form a closed lubricant chamber between said flat surface and the confronting interior surface of the housing, said ring having a grease duct drilled therethrough at one side of said ball race and connecting said chamber to the interior of said sealed unit, a fitting fixed in the housing wall opposite said flat surface through which lubricant can be introduced into said chamber, said fitting being disposed radially of said spherical surface and so located that said flat surface can be centered therewith when the bearing unit is aligned with the housing, and stop means associated with said fitting in alignment therewith and coactive with said flat surface for limiting angular movements of said ring and unit other than on axes extending through a central part of said flat surface, the said flat surface and inlet of said duct being covered by the housing and completely encircled by contacting spherical surfaces of said ring and housing in all positions which said unit can assume.

2. A self-aligning shaft bearing comprising a sealed antifriction bearing unit having an annular series of balls and an outer race ring in which they run, said ring having a spherical periphery with a truncated portion forming a flat surface of circular area centered at approximately the plane of centers of the balls and of a diameter substantially greater than the width of the ball race in said ring, the center of sphericity of said periphery being at approximately said plane, an interiorly spherical housing in which said unit fits and is universally angularly movable for self-alignment with the shaft, said ring and housing cooperating to form a closed lubricant chamber between said flat surface and the confronting interior surface of the housing, said ring having a grease duct drilled therethrough at one side of said ball race and connecting said chamber to the interior of said sealed unit, and means in the housing wall opposite said flat surface through which lubricant can be introduced into said chamber comprising a fixed stud disposed radially of said spherical surface and so located that said flat surface can be centered therewith when the bearing unit is aligned with the housing, said stud having its inner end protruding slightly into said chamber and clear of said flat surface when so centered and coactive therewith for limiting angular movements of said ring and unit other than on axes extending through a central part of said flat surface, the said flat surface and inlet of said duct being covered by the housing and completely encircled by contacting spherical surfaces of said ring and housing in all positions which the unit can assume.

3. A self-aligning shaft bearing comprising a sealed antifriction bearing unit having an annular series of balls and an outer race ring in which they run, said ring having a spherical periphery with a truncated portion forming a flat surface of circular area centered at approximately the plane of centers of the balls and of a diameter substantially greater than the width of the ball race in said ring, the center of sphericity of said periphery being at approximtaely said plane, an interiorily spherical housing in which said unit fits and is universally angularly movable for self-alignment with the shaft, said ring and housing cooperating to form a closed lubricant chamber between said flat surface and the confronting interior surface of the housing, said ring having a grease duct drilled straight therethrough from the outer portion of said flat surface and located with its outlet between said ball race and the adjacent sealing means of said unit, and means in the housing wall opposite said flat surface through which lubricant can be introduced into said chamber, comprising a fixed stud disposed radially of said spherical surface and so located that said flat surface can be centered therewith when the bearing unit is aligned with the housing, said stud having its inner end protruding slightly into said chamber and clear of said flat surface when so centered and coactive therewith for limiting angular movements of said ring and unit other than on axes extending through a central part of said flat surface, the said flat surface and inlet of said duct being covered by the housing and completely encircled by contacting spherical surfaces of said ring and housing in all positions which the unit can assume.

4. A self-aligning shaft bearing comprising a sealed antifriction bearing unit having an annular series of balls and an outer race ring in which they run, said ring having a spherical periphery with a truncated portion forming a flat surface of circular area centered at approximately the plane of centers of the balls and of a diameter substantially greater than the width of the ball race in said ring, the center of sphericity of said periphery being at approximately said plane, an interiorly spherical housing in which said unit fits and is universally angularly movable for self-alignment with the shaft, said ring and housing cooperating to form a closed lubricant chamber between said flat surface and the confronting interior surface of the housing, said ring having a grease duct drilled therethrough at one side of said ball race and connecting said chamber to the interior of said sealed unit, and means in the housing wall opposite said flat surface through which lubricant can be introduced into said chamber, comprising a fixed tubular stud disposed radially of said spherical surface and so located that said flat surface can be centered therewith when the bearing unit is aligned with the housing, said stud having a squared off inner end protruding slightly into said chamber and clear of said flat surface when so centered and cooperable therewith for limiting angular movements of said ring and unit other than on axes extending through a central part of said flat surface, the said flat surface and inlet of said duct being covered by the housing and completely encircled by contacting spherical surfaces of said ring and housing in all positions which the unit can assume.

5. A self-aligning antifriction shaft bearing comprising a sealed annular antifriction bearing unit whose outer race ring has a spherical periphery with a truncated portion forming a flat surface, an interiorly spherical housing in which said unit fits and is universally movable about its spherical center, a fitting removably fixed in the housing opposite to which said flat surface is presented and through which lubricant may be introduced into the space between said flat surface and confronting interior surface of the housing, and a radially movable element resting against said flat surface and whose outward movement is limited by said fitting for limiting the universal movement of said unit, said element being formed to allow passage of lubricant past it from said fitting to said space, and there being provision for passage of lubricant from said space through said ring to the interior of the sealed unit, the lubricating connections being maintained intact and unexposed in all positions which the unit can assume.

6. A self-aligning antifriction shaft bearing comprising a sealed annular antifriction bearing unit whose outer race ring has a spherical periphery with a truncated portion forming a flat surface, an interiorly spherical housing in which said unit fits and is universally movable about its spherical center, said housing having a hole extending through an upper part of its wall and said unit being arranged to present said flat surface opposite said hole, a fitting removably fixed in said hole through which lubricant may be introduced into the space between said flat surface and the confronting interior surface of the housing, said fitting extending only part way into said hole, a pin slidably fitted in said hole under said fitting and resting on said flat surface and liftable thereby into contact with said fitting for limiting the universal movement of said unit, said pin being formed to allow passage of lubricant through or around it, said ring having a lubricant passage leading from said flat surface and through the ring to the interior of the sealed unit, said flat surface and the part of said last named passage in the periphery of said ring being covered by the housing and completely encircled by contacting spherical surfaces of said ring and housing in all positions which the unit can assume.

DAVID FIRTH.

REFERENCES CITED

The following references are of record in the file of this patent:

UNITED STATES PATENTS

| Number | Name | Date |
|---|---|---|
| 342,716 | Steward | May 25, 1886 |
| 1,931,055 | Carver | Oct. 17, 1933 |
| 2,182,539 | Howarth | Dec. 5, 1939 |
| 2,194,328 | Shafer | Mar. 19, 1940 |
| 2,290,213 | Shafer | July 21, 1942 |
| 2,451,115 | Pew | Oct. 12, 1948 |